United States Patent [19]

Bricmont

[11] Patent Number: 4,553,925

[45] Date of Patent: Nov. 19, 1985

[54] FLOW DISTRIBUTION HEADER SYSTEM

[75] Inventor: Francis H. Bricmont, Pittsburgh, Pa.

[73] Assignee: Bricmont & Associates, Inc., McMurray, Pa.

[21] Appl. No.: 422,531

[22] Filed: Sep. 24, 1982

[51] Int. Cl.⁴ .............................................. F16K 21/00

[52] U.S. Cl. .................................... 431/178; 137/887; 137/883; 431/278; 431/284

[58] Field of Search ................... 137/561 A, 883, 887; 431/174, 178, 179, 180, 182, 284

[56] References Cited

U.S. PATENT DOCUMENTS

| | | | |
|---|---|---|---|
| 2,320,575 | 6/1943 | Dunn | 431/174 X |
| 2,458,542 | 1/1949 | Urquhart | 431/284 X |
| 2,625,992 | 1/1953 | Beck | 431/179 X |
| 3,110,754 | 11/1963 | Witort et al. | 138/115 X |
| 3,418,062 | 12/1968 | Hovis et al. | 431/350 |
| 3,695,817 | 10/1972 | Sharon | 431/182 X |
| 3,880,570 | 4/1975 | Marshall | 431/182 X |
| 3,902,840 | 9/1975 | Baguet | 431/284 X |
| 4,403,941 | 9/1983 | Okiura et al. | 431/174 X |

FOREIGN PATENT DOCUMENTS

| | | | |
|---|---|---|---|
| 722898 | 2/1955 | United Kingdom | 431/178 |

*Primary Examiner*—Alan Cohan
*Assistant Examiner*—John C. Fox
*Attorney, Agent, or Firm*—Clifford A. Poff; Thomas H. Murray

[57] ABSTRACT

A dual flow distribution header system in which the flow is divided into two paths before the distribution header but after a metering device. The flow is controlled by separate butterfly valves in each path, whereby the control function is magnified and becomes more precise in each path. The invention is particularly adapted for use with industrial heating furnaces employing dual burner systems.

8 Claims, 3 Drawing Figures

FLOW DISTRIBUTION HEADER SYSTEM

BACKGROUND OF THE INVENTION

The demand for improved efficiency of reheat furnaces has resulted in the use of burners requiring two separate air supplies or the intermixing of large and small burners across the width of a furnace. In either case, this requires two separate air supply headers. Due to the very large sizes involved, the cost is very high and this doubles the normal quantity of pipe generally used in this area resulting in an additional restriction in an area that is normally conjested, thus increasing the maintenance cost of the furnace system.

While not limited thereto, the present invention is particularly adapted for use with industrial heating furnaces such as reheating furnaces used to heat steel slabs to the hot-working temperature. In such furnaces, the steel slabs are brought up to the hot-working temperature as they are conveyed through a furnace by means of a pusher, walking beam or other device. The reheat furnace temperature through the length is not uniform, being colder at the charge end and hot where discharged. This furnace can have one zone of temperature control or have multiple zones of independent temperature control. The steel, as it progresses through the furnace, gets hotter and reaches the maximum temperature and best uniformity just prior to being discharged from the furnace. Heating the steel faster causes more fuel to be used and increases the formation of scale on the steel surface. To prevent or minimize the deterrent effects, the combustion system must have the ability to operate over a wide range of inputs with minimum amount of excess air, particularly in the case where there is a breakdown in the rolling mill complex and steel flow through the reheat furnace must stop. Under this condition, it is desirable to keep steel temperature at its present level or reduce the temperature to some lower value. This is the condition that requires the combustion system to operate at a lower than normal input. In fact, during long delays the fuel input is only needed to overcome the heat loss through the furnace walls, hearth and roof. This input can be 5% to 10% of the normal fuel input for this zone. The normal burner can operate efficiently at 20% flow but below that requires additional air which becomes detrimental to steel surface conditions (increased scale) and also decreases combustion efficiency. The use of large and small burners intermixed across the width of the furnace allows the larger burner to be shut-off and the smaller burners to operate at an input that is still efficient. Both burners require an air supply header.

SUMMARY OF THE INVENTION

The present invention, while particularly adapted for industrial furnaces of the type described above, is applicable to any distribution system for air or other compressible fluids which employs a distribution header. By dividing the flow before the distribution header but after a metering device, and by controlling the flow in each path, the control function is magnified in each path. The paths may be divided in any proportion, thereby adjusting the "magnification" of the lower range of flow. The individuality of each path is maintained in a unique dual chamber header having nozzle connections from each chamber of the header to the final process device, such as a burner for an industrial furnace.

The above and other objects and features of the invention will become apparent from the following detailed description taken in connection with the accompanying drawings which form a part of this specification, and in which.

Figure 1:
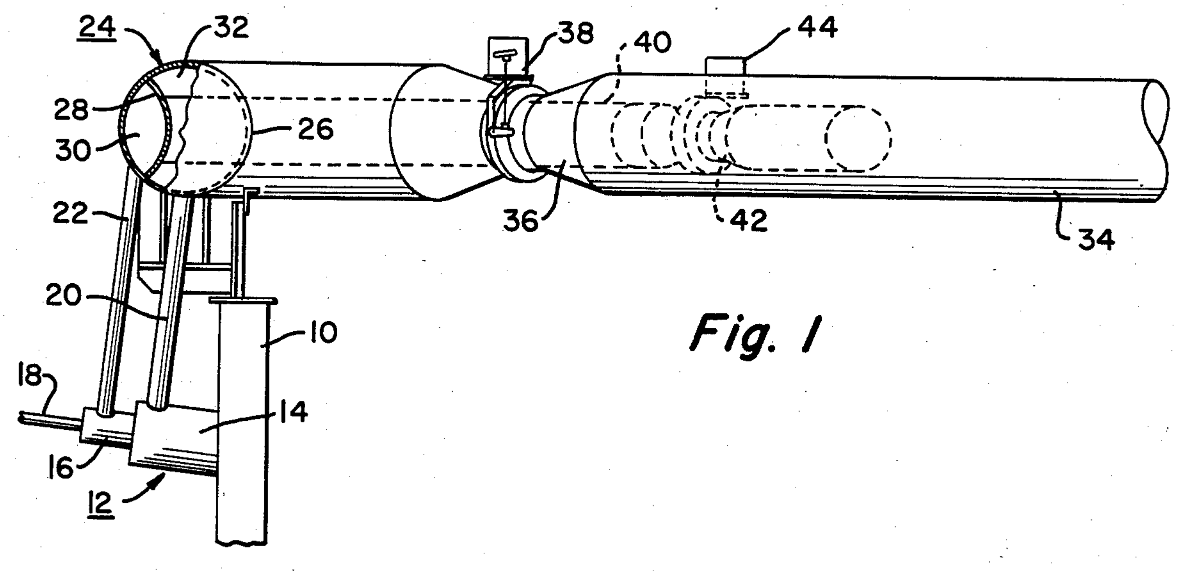
FIG. 1 is a side elevational view of a flow distribution system constructed in accordance with the principles of the invention.
Figure 2:
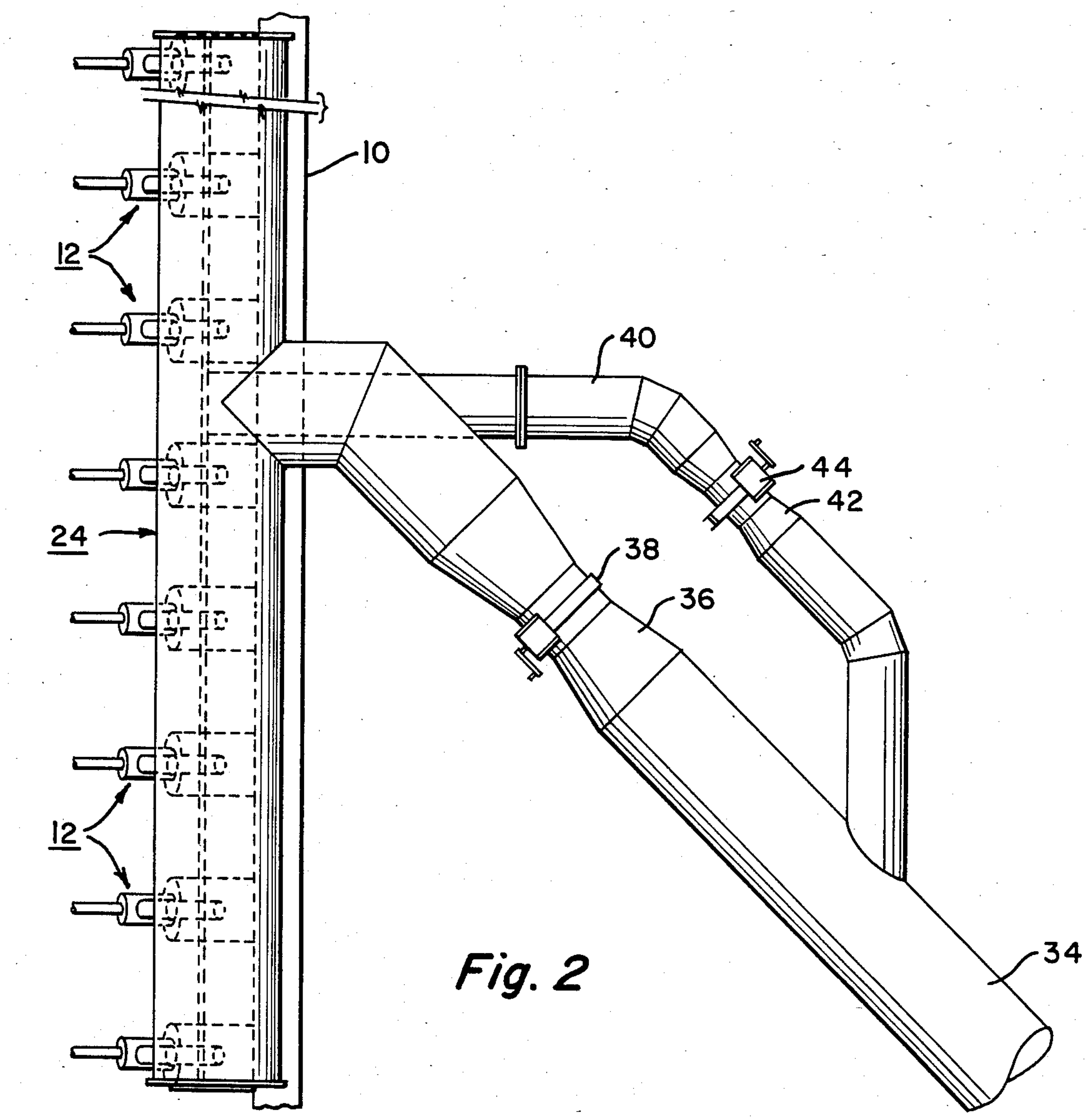
FIG. 2 is a top view of the distribution system shown in FIG. 1.

With reference now to the drawings, and particularly to FIGS. 1 and 2, there is shown a wall 10 of an industrial furnace, such as a slab reheating furnace, provided with dual burner structures of the type shown in U.S. Pat. No. 3,418,062. The burner structures are identified generally by the reference numeral 12 and include a large diameter burner section 14 (FIG. 1) and a coaxial smaller diameter burner section 16, the two sections being supplied with gaseous fuel via conduit 18. The details of the burner structure need not be described herein except to state that the large diameter section 14 is employed to bring the steel slabs or billets within the furnace up to the hot-working temperature; while the smaller diameter burner 16 is used to maintain the slabs at the hot-working temperature once it is achieved or to bring steel up to temperature at very low production rates. Hot or cold combustion-supporting air is supplied to burner section 14 through conduit 20; while hot or cold combustion-supporting air is supplied to burner section 16 via conduit 22. As the burner is turned down from its rated capacity, the hot or cold air passing through conduit 20 is reduced until the burner section 14 is turned OFF and burner section 16 is employed with air being supplied through conduit 22.

While the burner assembly 12 is shown herein as being comprised of two coaxial burner sections, it should be understood that separate large diameter and smaller diameter burner sections can project through the wall of the furnace with the same overall effect.

Conduits 20 and 22 are connected to a dual header assembly, generally indicated by the reference numeral 24. It comprises an outer cylindrical shell 26 provided with a curved division wall 28 which divides the header into two chambers 30 and 32. Chamber 30 is of smaller cross-sectional area and is connected to the conduit 22 for burner 16; while chamber 32 of larger cross-sectional area and larger volume is connected through conduit 20 to the burner section 14.

As best shown in FIG. 2, the header 24 is supplied with hot or cold air for combustion from a supply conduit 34 which leads through a metering device, not shown, to a recuperator or the like. Conduit 34 has a reduced diameter section 36 which incorporates a butterfly valve 38. Hot or cold air, after passing through the butterfly valve 38, passes into the large volume header chamber 32. The smaller volume header chamber 30, however, is connected to a bypass conduit 40 which shunts air around the butterfly valve 38. The shunt conduit 40 is of smaller diameter than conduit 34 and is also provided with a reduced diameter section 42 incorporating a butterfly valve 44. With the arrangement shown, it will be appreciated that air supplied to chamber 32 and burner section 14 is controlled by butterfly valve 38; while combustion air supplied to chamber 30 and burner section 16 flows through bypass conduit 40 and butterfly valve 44.

Figure 3:
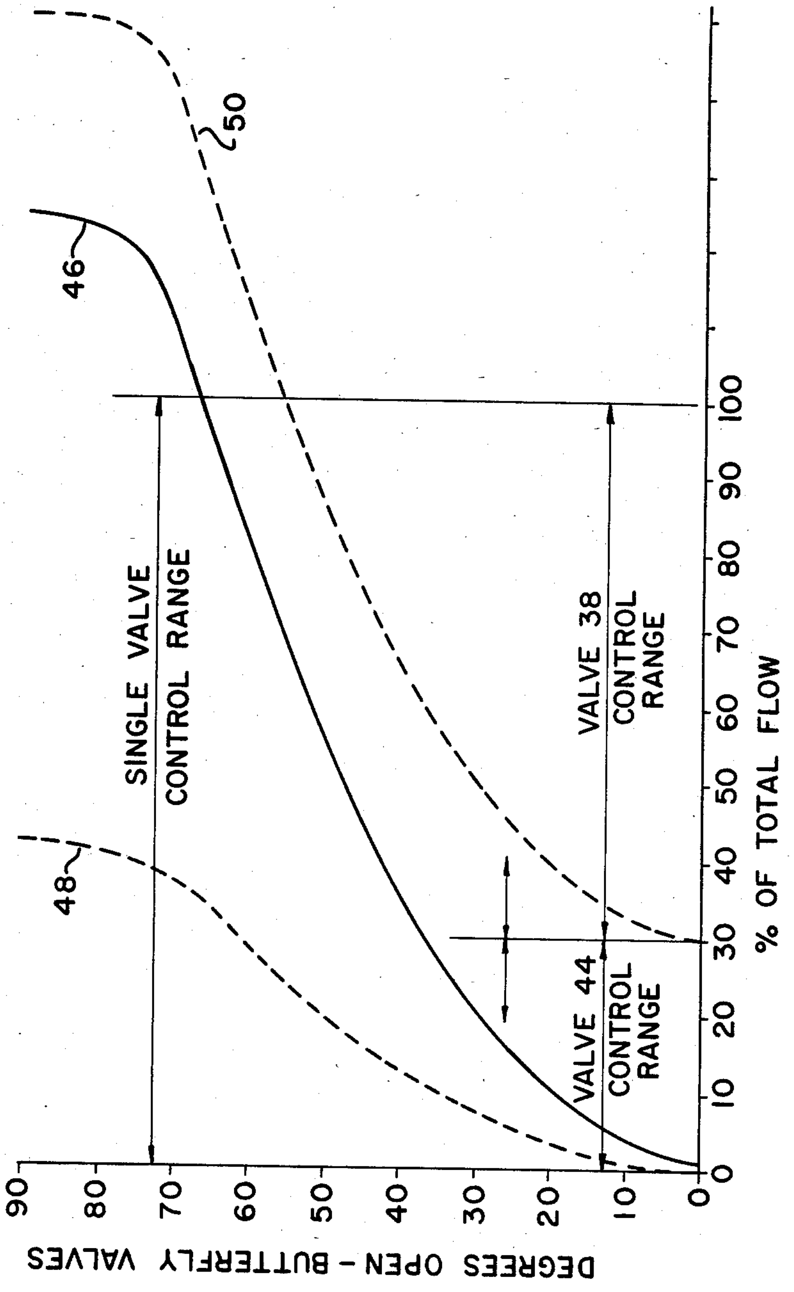
FIG. 3 is a graph of percentage of flow versus the angle of a butterfly valve or valves in the flow distribution system of the invention, showing its relationship to a conventional flow distribution system.

In FIG. 3, the flow control characteristics of a distribution system employing a single butterfly valve and a single header are illustrated by the curve 46; while the flow control characteristics of the present invention are illustrated by curves 48 and 50, curve 48 being that for the small diameter butterfly valve 44 and curve 50 being that for the large diameter butterfly valve 38. From curve 46, it can be seen that with a single butterfly valve, about 65% of travel of the butterfly valve from its fully-closed position (i.e., 0° ) results in 100% flow. At the lower range (i.e., 0% to 30% of full flow), it takes a very large change in the valve opening (nearly 35°) to achieve the 0% to 30% change in rate of flow. On the other hand, only about 30° of travel is required to change the rate of flow from 30% to 100%. The result is that in the lower flow rates, it is difficult to obtain precise control.

In the present invention, the butterfly valve 38 is closed in the lower rate of flow range (i.e., 0% to 30% of full flow). Under these conditions, the butterfly valve 42 is used for control along the curve 48. It will be appreciated from a consideration of curve 48 that much more precise control can be achieved with the smaller diameter butterfly valve in this range. After 30% of full flow is achieved, valve 38 is then opened with a flow-degrees open characteristic illustrated by the curve 50. Thus, the small diameter valve 44 has a control range of about 0% to 30% of full flow and remains open while the large diameter valve 38 controls the rate of flow between about 30% and 100% of full flow.

From the foregoing, it can be seen that by dividing the flow before the distribution header while controlling the flow in each path, the control function is magnified greatly. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A flow distribution header system in combination with a furnace for heating workpieces, the combination including a plurality of burners each having a large diameter burner section operative for heating workpieces at a normal production rate to a desired working temperature, and a small diameter burner section operative for maintaining workpieces at a desired working temperature and for heating workpieces at a production rate below normal production rate, a common inlet duct for a fluid to be distributed, an elongated cylindrical conduit having an interior division wall dividing it into first and second elongated headers connected to the small and large diameter burner sections respectively, the first of said headers being of lesser volume than the second, a first conduit penetrating said division wall to connect said inlet duct to said first header, a second conduit connecting said inlet duct to said second header, said first conduit being of smaller cross-sectional area than said second conduit, a first throttling valve means in said second conduit for controlling a high range of fluid flow from said inlet duct to the large diameter burner section of each of said burners and a second throttling valve means in said first conduit for controlling a low range of fluid flow from said inlet duct to the small diameter burner section of each of said burners.

2. The system of claim 1 wherein said first conduit of smaller cross-sectional area is connected to said common inlet duct at a point ahead of the first throttling valve means in said second conduit.

3. The system of claim 1 additionally including connection means adapting each of said first and second headers for connection to a respective plurality of burners to receive combustion supporting air via said header system.

4. The system of claim 1 wherein said first and second headers are mutually coextensive with at least a longitudinally-extending portion of said cylindrical conduit.

5. A flow distribution header system in combination with a furnace for heating workpieces, the combination including a plurality of burners each having a large diameter burner section operative for heating workpieces at a normal production rate to a desired working temperature, and a small diameter burner section operative for maintaining workpieces at a desired working temperature and for heating workpieces at a production rate below normal production rate, a common inlet duct for a fluid to be distributed, an elongated cylindrical conduit having an interior division wall dividing it into first and second elongated headers connected to the small and large diameter burner sections respectively, the first of said headers being of lesser volume than the second, a first conduit connecting said inlet duct to said first header, a second conduit connecting said inlet duct to said second header, said first conduit being of smaller cross-sectional area than said second conduit, a first throttling valve means in a reduced cross-sectional area portion of said second conduit for controlling a high range of fluid flow from said inlet duct to the large diameter burner section of each of said burners and a second throttling valve means in a reduced cross-sectional area portion of said first conduit for controlling a low range of fluid flow from said inlet duct to the small diameter burner section of each of said burners.

6. The system of claim 5 wherein said first conduit of smaller cross-sectional area is connected to said common inlet duct at a point ahead of the first throttling valve means in said second conduit.

7. The system of claim 5 additionally including connection means adapting each of said first and second headers for connection to a respective plurality of burners to receive combustion supporting air via said header system.

8. The system of claim 5 wherein said first and second headers are mutually coextensive with at least a longitudinally-extending portion of said cylindrical conduit.

* * * * *